United States Patent

Wysocki

[15] 3,697,150
[45] Oct. 10, 1972

[54] ELECTRO-OPTIC SYSTEMS IN WHICH AN ELECTROPHORETIC-LIKE OR DIPOLAR MATERIAL IS DISPERSED THROUGHOUT A LIQUID CRYSTAL TO REDUCE THE TURN-OFF TIME

[72] Inventor: Joseph J. Wysocki, Webster, N.Y.
[73] Assignee: Xerox Corporation, Stamford, Conn.
[22] Filed: Jan. 6, 1971
[21] Appl. No.: 104,366

[52] U.S. Cl. ...............350/150, 252/408, 350/160
[51] Int. Cl. ...............................................G02f 1/16
[58] Field of Search .......252/300, 408; 350/150, 160

[56] References Cited

UNITED STATES PATENTS

| | | |
|---|---|---|
| 3,519,330 | 7/1970 | Heilmeier ..............350/160 R |
| 3,551,026 | 12/1970 | Heilmeier ..................350/150 |
| 3,575,492 | 4/1971 | Nester et al............350/160 R |
| 3,575,493 | 4/1971 | Heilmeier ..............350/160 R |

Primary Examiner—Ronald L. Wibert
Assistant Examiner—Edward S. Bauer
Attorney—James J. Ralabate, David C. Petre and Roger W. Parkhurst

[57] ABSTRACT

A system for transforming an optically negative liquid crystalline mesophase composition to an optically positive liquid crystalline mesophase composition by an applied electrical field, and imaging compositions which facilitate the relaxation of the transformed optically positive composition into the initial optically negative state. The invention also encompasses imaging systems wherein this electrical field-induced transition images a liquid crystalline imaging composition.

20 Claims, 5 Drawing Figures

PATENTED OCT 10 1972 3,697,150

INVENTOR.
JOSEPH J. WYSOCKI
BY
Roger W. Parkhurst
ATTORNEY

ELECTRO-OPTIC SYSTEMS IN WHICH AN ELECTROPHORETIC-LIKE OR DIPOLAR MATERIAL IS DISPERSED THROUGHOUT A LIQUID CRYSTAL TO REDUCE THE TURN-OFF TIME

BACKGROUND OF THE INVENTION

This invention relates to electro-optic systems, and more specifically to electro-optic systems including liquid crystalline compositions which facilitate the relaxation or switching time of such electro-optic systems. Furthermore, this invention also relates to imaging systems wherein the imaging member comprises a liquid crystalline composition, and to compositions to facilitate the relaxation or switching time of such imaging systems.

There has recently been widespread interest in the discovery of more useful applications for the class of materials known as "liquid crystals." The name "liquid craystals" has become generic to liquid crystalline materials which exhibit dual physical characteristics, some of which are typically associated with liquids, and others which are typically unique to crystalline solids. Liquid crystals exhibit mechanical characteristics such as viscosities, which are ordinarily associated with liquids. The optical characteristics of liquid crystals are more similar to those characteristics ordinarily unique to crystalline solids. In liquids or fluids, the molecules are typically randomly distributed and oriented throughout the mass of the material. Conversely, in crystalline solids molecules are generally rigidly oriented and arranged in a specific crystalline lattice structure. Liquid crystals resemble solid crystals in that the molecules of liquid crystalline substances are regularly oriented in a fashion analogous to, but less extensive than, the molecular orientation and structure in a crystalline solid. Many substances have been found to exhibit liquid crystalline characteristics in a relatively narrow temperature range; however below that temperature range the substances typically appear as crystalline solids, and above that temperature range they typically appear as liquids.

Liquid crystals are known to appear in three different mesomorphic forms: the smectic, nematic, and cholesteric. In the nematic structure, the molecular organization is characterized by the approximately parallel orientation of the major axes of the individual molecules with respect to one another. In the cholesteric structure, the molecules are believed to be arranged in a series of distinguishable layers, and within any such layer, the molecules are believed to be arranged with their major axes approximately parallel to each other. The major axes of the molecules in the cholesteric structure are believed to be parallel to the planes of the layers, and the molecular layers are thin. Additionally, when compared to a hypothetical straight line axis passing through a cholesteric liquid crystalline material perpendicular to the planes of molecules within the material, it is seen that the parallel direction of the molecular axes of the adjacent molecules within a given layer is angularly displaced with respect to the straight line axis, thereby tracing out a helical path around the straight line axis. It is believed that this helically displaced layered structure is caused by the shape of the molecules within the thin layers. The cholesteric structure originally derived its name from the fact that materials exhibiting the cholesteric liquid crystalline mesophase structure typically were molecules which were derivatives of cholesterol or which were shaped very similarly to molecules of cholesterol.

Liquid crystals have been found to be sensitive or responsive to various stimuli including electrical fields, as disclosed, for example, in copending application Ser. No. 646,532, filed June 16, 1967; copending application Ser. No. 4,644, filed Jan. 21, 1970; and French Pat. No. 1,484,584. Most recently, electro-optic systems and imaging systems wherein the imaging member comprises a liquid crystalline material have been discovered, and are described in copending applications Ser. No. 821,565, filed May 5, 1969, now U.S. Pat. No. 3,652,148 and Ser. No. 47,698, filed June 19, 1970.

Various combinations of liquid crystalline compositions with other additives are known. For example, Fergason U.S. Pat. No. 3,409,404 shows the compatibility of cholesteric liquid crystalline materials with oil additives, and Fergason's article in *Applied Optics*, Vol. 7, No. 9, September, 1968, p. 1730, shows that dyes may be added to cholesteric materials. Dreyer U.S. Pat. No. 2,544,659, French U.S. Pat. No. 3,440,620, and Goldmacher et al. U.S. Pat. No. 3,499,702 disclose nematic liquid crystalline compositions with additives or "-guests." However, in new and growing areas of technology such as liquid crystalline electro-optic and imaging systems, new methods, apparatus, compositions, and articles of manufacture are often discovered for the application of the new technology in a new mode. Similarly, further new uses and surprising and advantageous results of uses of such new technology are being discovered. The present invention relates to a new system, and new and advantageous imaging compositions, for decreasing the relaxation or switching time in liquid crystalline electro-optic systems.

SUMMARY OF THE INVENTION

It is, therefore, an object of this invention to provide a novel electro-optic system.

It is another object of this invention to provide a novel liquid crystalline imaging system.

It is another object of this invention to provide novel compositions for use in liquid crystalline electro-optic systems.

It is another object of this invention to transform an optically negative liquid crystalline composition to an optically positive liquid crystalline composition by an applied electrical field.

It is another object of this invention to transform a cholesteric liquid crystalline composition to a nematic liquid crystalline composition in an applied electrical field.

It is another object of this invention to provide a new means for reducing the relaxation time, or controlling the return of a transformed liquid crystalline electro-optic system to its initial or equilibrium state.

It is another object of this invention to facilitate the relaxation of a liquid crystalline material in a field-induced optically positive state into its normal optically negative state without the application of external stimuli.

It is yet another object of this invention to provide a color imaging system.

The foregoing objects and others are accomplished in accordance with this invention by a system for transforming an optically negative cholesteric liquid crystalline composition to an optically positive nematic liquid crystalline composition by an applied electrical field. This system includes imaging compositions which facilitate the relaxation of the transformed optically positive composition into the initial optically negative state. The invention also encompasses imaging systems wherein this electrical field-induced transition images a liquid crystalline imaging composition.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein.

DESCRIPTION OF THE PREFERRED EMBODIMENTS

Figure 1:
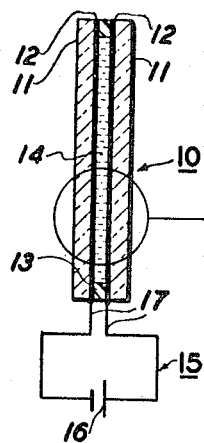
FIG. 1 is a partially schematic, cross-sectional view of an embodiment of a liquid crystalline electro-optic imaging member.

FIG. 1 illustrates a liquid crystalline, electro-optic cell 10 in partially schematic, cross-sectional view wherein a pair of supporting plates 11 having conductive coating 12 upon the contact surface thereof, comprise a substantially parallel pair of electrodes. The supporting plates 11 may be transparent, and the conductive coatings 12 may also be substantially transparent conductive coatings. A cell wherein both electrodes are transparent is preferred where the cell is to be used with transmitted light; however, such liquid crystalline electro-optic cells may also be used with reflected light thereby requiring only a single transparent electrode while the other may be translucent or opaque. The electrodes, which for the purposes of illustration shall be referred to as transparent electrodes, are typically separated by spacing or gasket member 13 which contains voids which form one or more shallow cups which may contain the liquid crystalline film or layer which comprises the active element in the electro-optic cell. An electrical field is created between the electrodes by an external circuit 15 which typically comprises a source of potential 16 which is connected across the two electrodes through leads 17. The potential source may be either D.C., A.C., or a combination thereof.

Figure 1A:
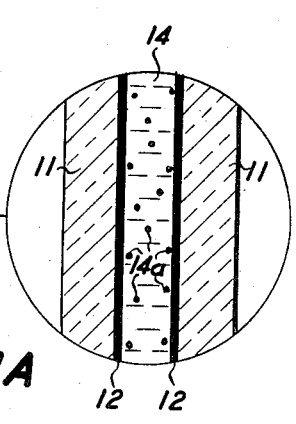
FIG. 1A is a magnified portion of the cross-sectional view of FIG. 1.

FIG. 1A is a partially schematic magnification of a portion of the cross-sectional view of FIG. 1 showing the support members 11 with the conductive or substantially transparent conductive coatings 12 thereon with the liquid crystalline film or layer 14 enclosed between the conductive electrodes. In addition, in the present invention the liquid crystalline composition also comprises or includes the advantageous additive 14A which is dispersed throughout the liquid crystalline electro-optic composition matrix.

Figure 3:
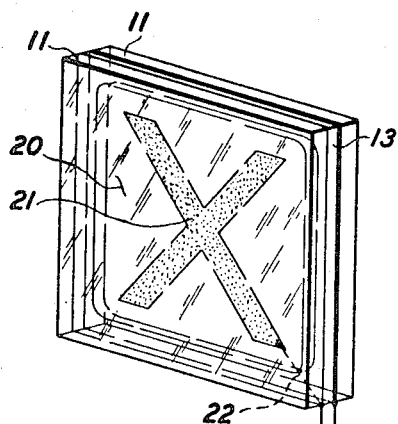
FIG. 3 is a partially schematic isometric view of an embodiment of a liquid crystalline imaging member wherein the desired image is defined by the shape of at least one facing electrode.
Figure 2:
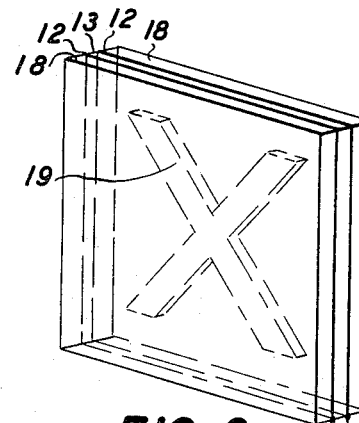
FIG. 2 is a partially schematic isometric view of an embodiment of a liquid crystalline imaging member wherein the desired image is defined by the shape of the spacing member.

The liquid crystalline electro-optic cell described in FIG. 1 and FIG. 1A may, in various embodiments, be used as an imaging system, for example as illustrated in FIGS. 2 and 3. In FIG. 2 an embodiment of such a liquid crystalline electro-optic imaging member is shown with the desired image configuration defined by the shape of the void areas in the spacer gasket 13. As before, transparent electrodes 18 are separated by the spacer 13, but the desired image area 19 comprises the liquid crystalline film or layer. In this embodiment the entire inner faces of the transparent electrodes comprise substantially transparent conductive coating 12, and the conductive coatings are electrically connected to external circuit 15. In operation there is an electrical field across the entire area of the spacer 13, however the electro-optic imaging effect in the liquid crystalline film causes imaging to occur only in the area 19 where the liquid crystalline film is present. Again here, depending upon whether the desired image is to be viewed by transmitted or reflected light, both or only one of the electrodes, respectively, may be transparent.

In FIG. 3 another preferred embodiment of the liquid crystalline electro-optic imaging member is shown. Here the desired image is defined by the shape of an electrode, and therefore by the shape of the corresponding electrical fields produced by the system including that electrode. The imaging member here comprises transparent support plates 11 separated by spacer gasket 13 having void area 20 filled with liquid crystalline electro-optic composition, and the area of the void 20, and its included liquid crystalline imaging composition, comprises substantially the entire area of the spacer layer 13. The desired image is defined by the shape of the substantially transparent conductive coating here shown in imagewise configuration 21, which is affixed to the inner surface of one or both of the transparent support plates 11, and is affixed in the desired image configuration. The embodiment illustrated in FIG. 3 shows only one of the two electrodes in imagewise configuration; however, it will be understood by those skilled in the art that both electrodes could easily be made in a congruently matched pair to define the same desired image. When the single imagewise electrode configuration is used, the second electrode will typically comprise transparent plate 11 with substantially transparent conductive coating 12 upon the entire area of the inner surface of the transparent support 11. It is noted that a very thin, or substantially invisible conductor 22 is typically used in this embodiment to electrically connect the electrode in the desired image configuration to external circuit 15, which is similarly connected to the conductive coating of the opposite electrode. In operation this embodiment typically produces electrical fields only in areas where there are parallel electrodes, i.e., between the electrode and the desired image configuration, and the opposite electrode, whether or not the second electrode is also in the desired image configuration. Again here, one of the electrodes may be opaque if it is desired to observe the imaging member by reflected light rather than transmitted light.

The electro-optic effect of the liquid crystalline imaging members of the present invention, which may also be used as a liquid crystalline electro-optic imaging system, is in part described in copending application Ser. No. 821,565, filed May 5, 1969 and now U.S. Pat. No. 3,652,148, the entire disclosure of which is hereby expressly incorporated by reference in the present specification. In the system described in that copending application and in the system of the present invention, cholesteric liquid crystals, a mixture of cholesteric liquid crystalline materials, or a composition exhibiting cholesteric liquid crystalline characteristics is used in an electrode sandwich configuration embodiment such as that described in FIG. 1 so that high strength electrical fields across the liquid crystalline composition film cause an electrical field-induced phase transition to occur wherein the optically negative cholesteric liquid crystalline composition is transformed into an optically positive liquid crystalline state. The electro-optic cholesteric liquid crystalline compositions suitable for use in the present invention typically have a transition threshold field strength at or above which the advantageous transition takes place. This transition is believed to be the result of the cholesteric liquid crystal transforming into the nematic liquid crystalline mesophase structure. This is believed to be a bulk effect which affects the entire cross-section of the transformed portions of the composition layer. Cholesteric liquid crystals, or compositions exhibiting cholesteric liquid crystalline characteristics are typically translucent, for example, like a milky white, opalescent layer, when placed in the unbiased electrode sandwich. When the high strength electrical fields are placed across the liquid crystalline film, the field-induced phase transition is observable because the liquid crystal film becomes substantially transparent in areas where the field is present.

Figure 4:
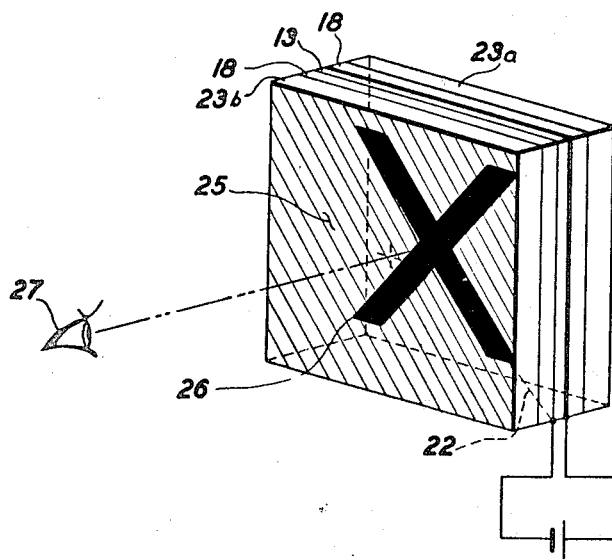
FIG. 4 is a partially schematic isometric view of an embodiment wherein a liquid crystalline imaging member is viewed between polarizers.

When viewed between polarizers with transmitted light, for example as illustrated in FIG. 4, the areas in which the field-induced phase transition has taken place appear dark, while the unchanged, translucent, light scattering and birefringent composition still exhibiting the cholesteric liquid crystalline characteristics retains the light-colored appearance. When such a liquid crystalline electro-optic cell is observed between polarizers, the light source 24 emits light which is planar polarized while passing through polarizer 23a, scattered by the translucent cholesteric liquid crystalline composition in non-image areas 25 (the same as areas 20 in FIG. 3), and is transmitted by the field-induced nematic liquid crystalline areas 26. A viewer 27 sees the planar polarized light which passes through polarizer (or analyzer) 23b which originated from source 24 and was scattered and passed through the non-imaged portion of the liquid crystalline electro-optic composition contained between the electrodes 18 by spacer gasket 13. It will be appreciated by those skilled in the art that polarizers 23a and 23b (or polarizer and analyzer combination) are typically used so that the planes of polarization of the two polarizers are approximately normal to each other. Of course the two polarizers may be rotated with respect to one another to achieve any desired degree of contrast of which the particular system is capable. Although the light polarized by polarizer 23a is typically polarized in a plane crossed with the plane of polarizer 23b, the effect of the cholesteric liquid crystalline composition between the substantially transparent electrodes is to scatter sufficient amounts of the originally planar-polarized light to allow some of it to pass through polarizer 23b. However, in the image areas 26, the effect of polarizers 23, when said polarizers have their respective planes of polarization crossed approximately normal to each other, is to substantially cut off the transmission of light through the polarizer 23a in the transformed image area 26 so that the image area 26 appears dark, as illustrated in FIG. 4.

Any other means suitable for enhancing the contrast of the imaged areas may also be used in place of the polarizers. For example various light filtering systems, or differential lighting systems may be used. Hence, it is seen that either field or non-field areas in an electro-optic, liquid crystalline imaging sandwich may be used to create the desired image, with or without the addition of means for image enhancement.

In the liquid crystal electro-optic cells and imaging members described herein the electrodes may be of any suitable transparent conductive material. Typical suitable transparent, conductive electrodes include glass or plastic substrates having substantially transparent and continuously conductive coatings of conductors such as tin, indium oxide, aluminum, chromium, tin oxide, or any other suitable conductor. These substantially transparent conductive coatings are typically evaporated onto the more insulating, transparent substrate. NESA glass, a tin oxide coated glass manufactured by the Pittsburgh Plate Glass Company, is a commercially available example of a typical transparent, conductive electrode material. Of course where opaque electrodes are used herein, any suitable electrically conductive material may be used.

The spacer, 13 in FIG. 1, which separates the transparent electrodes and contains the liquid crystal film between said electrodes, is typically chemically inert, transparent, not birefringent, substantially insulating and has appropriate dielectric characteristics. When the cell is to be used with polarizers, it is also desireable that the spacer material be optically isotropic. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluorethylene, polyethylene terephthalate, and mixtures thereof.

The liquid crystal imaging film 14 may comprise any suitable cholesteric liquid crystal, mixture of cholesteric liquid crystals, or composition which exhibits cholesteric liquid crystalline characteristics. Typical cholesteric liquid crystals include derivatives from reactions of cholesterol and inorganic acids; for example, cholesteryl chloride, cholesteryl bromide, cholesteryl iodide, cholesteryl fluoride, cholesteryl nitrate; esters derived from reactions of cholesterol and carboxylic acids; for example cholesteryl crotonate; cholesteryl nonanoate; cholesteryl hexanoate; cholesteryl formate; cholesteryl docosonoate; cholesteryl chloroformate; cholesteryl propionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caprate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl heptyl carbamate; and alkyl amides and aliphatic secondary amines derived from $3\beta$-amino- $\Delta5$-cholestene and mixtures thereof; peptides such as cholesteryl polybenzyl-l-glutamate; derivatives of beta sitosterol such as sitosteryl chloride; and amyl ester of cyano benzylidene amino cinnamate. The alkyl groups in said compounds are typically saturated or unsaturated fatty acids; or alcohols, having less than about 25 carbon atoms, and unsaturated chains of less than about five double-bonded olefinic groups. Aryl groups in the above compounds typically comprise simply substituted benzene ring compounds. Any of the above compounds and mixtures thereof may be suitable for cholesteric liquid crystalline films in the advantageous system of the present invention.

Smectic liquid crystalline materials are suitable for use as components of the imaging composition in the present invention and such smectic liquid crystal materials include: n-propyl-4'-ethoxy biphenyl-4-carboxylate; 5-chloro-6-n-heptyloxy-2-naphthoic acid; lower temperature mesophases of cholesteryl octanoate, cholesteryl nonanoate, and other open-chain aliphatic esters of cholesterol with chain length of seven or greater; cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl-4-carboxylic acids' ethyl-p-azoxy-cinnamate; ethyl-p-4-ethoxybenzylideneaminocinnamate; ethyl-p-azoxybenzoate; potassium oleate; ammonium oleate; p-n-octyloxy-benzoic acid; the low temperature mesophase of 2-p-n-alkoxy-benzylideneaminofluorenones with chain length of seven or greater; the low temperature mesophase of p-(n-heptyl)oxybenzoic acid; anhydrous sodium stearate; thallium (I) stearate; mixtures thereof and others.

Nematic liquid crystalline materials suitable for use as components of the imaging composition in the advantageous system of the present invention include: p-azoxyanisole, p-azoxyphenetole, p-butoxybenzoic acid, p-methoxy-cinnamic acid, butyl-p-anisylidene-p-aminocinnamate, anisylidene paraamino-phenylacetate, p-ethoxy-benzalamino-a-methyl-cinnamic acid, 1,4-bis(p-ethoxy benzylidene) cyclohexanone, 4,4'-dihexyloxybenzene, 4,4'-diheptyloxybenzene, anisal-p-amino-azo-benzene, anisaldazine, a-benzeneazo- (anisal-$\alpha'$-naphthylamine), n,n'-nonoxybenzetoluidine; anils of the generic group (p-n-alkoxybenzylidene-p-n-alkylanilines), such as p-methoxybenzylidene p'-n-butylaniline, mixtures of the above and many others.

The above lists of materials exhibiting various liquid crystalline phases are not intended to be exhaustive or limiting. The lists disclose a variety of representative materials suitable for use in the imaging composition or mixture comprising cholesteric liquid crystalline materials, which comprises the active imaging element in the advantageous system of the present invention.

Mixtures of liquid crystals or liquid crystalline compositions can be prepared in organic solvents such as chloroform, petroleum ether, methylethyl ketone and others, which are typically subsequently evaporated from the composition after the composition is placed in the desired electro-optic cell or on a suitable electrode or other suitable substrate. Alternatively, the individual liquid crystals of the liquid crystalline mixture or composition can be prepared by heating the mixed components above the liquid isotropic transition temperature of the composition or of its components, thoroughly mixing the liquid composition, and placing the liquid composition in the cell or on a suitable electrode or substrate, and allowing the composition to cool into its cholesteric liquid crystalline mesophase temperature range. Room temperature liquid crystals may be used in their natural condition. It should be noted that in some embodiments, after preparation by the above means, the layer of liquid crystalline composition in the present invention may itself possess sufficient integrity to remain in place in the electro-optic imaging system without a confining gasket. For example, the composition may have a sufficiently high viscosity to maintain its position on a surface when the surface is oriented vertically or even horizontally with the composition layer on the lower surface (i.e., the adhesion of the viscous composition is sufficient to overcome gravitational force).

The layers of electro-optic composition having cholesteric liquid crystalline characteristics are typically of thickness not greater than about 250 microns, although thicker layers may perform satisfactorily in some embodiments of the inventive system. For preferred imaging results, the composition layers are preferably of thickness in the range between about 1 and about 50 microns. It will be appreciated that thinner layers of the electro-optic composition will require smaller voltages across the layer to produce the desired results in the inventive system.

In the advantageous electro-optic system described in application Ser. No. 821,565 now U.S. Pat. No. 3,652,148, which is similarly used in the present invention, the high strength electrical fields which typically produce the desired results are generally in the range between about $10^2$ and $10^6$ volts/cm. of thickness of the layer of electro-optic liquid crystalline composition, and preferred electro-optic and imaging results are typically achieved using field strengths on the order of about $10^4$–$10^5$ volts/cm.

The turn-on switching time for such electro-optic cells or imaging systems is typically not greater than about 1 second. Any applied field strength of magnitude greater than the transition threshold field strength of the cholesteric composition is typically sufficient to cause the desired effect. However, it is found that field strengths somewhat higher than the transition threshold field strength typically reduce the turn-on switching or response time of the system.

The electrical field-induced optically negative to optically positive phase transition system of application Ser. No. 821,565, and of the present invention, has also been found to be suitable as a transient color display when the field strength of the electrical field across the electro-optic liquid crystalline composition layer is decreased to a value below the threshold field required to produce the phase transition in the composition layer. With the field strength below the threshold field value, the field-induced transformed portions of the composition layer are allowed to resume their original, optically negative cholesteric liquid crystalline state. This re-transformation or relaxation may occur over a period which may vary from fractions of a second to minutes or hours, depending upon the specific embodiment of the inventive system. Transient electro-optic or electro-optic imaging systems may make use of all or any portion of this relaxation transition. It is noteworthy that the transient display characteristics are observed when the relaxation or retransformation occurs in the absence of an electrical field. As the initially sharp, field-induced optically positive, nematic transformed portions of the composition layer relax back into their original, optically negative cholesteric state, the birefringence and optical activities of the liquid crystalline material changes drastically giving rise to changing color patterns which stand out vividly from non-transformed portions of the liquid crystalline composition layer or from other surrounding background areas. In many many embodiments this relaxation or retransformation occurs over a sufficient length of time, i.e. at least a few seconds, to be quite useful as a dynamic color display system.

It will be appreciated that in electro-optic cells or imaging systems utilizing the electro-optic liquid crystalline phase transition system of the present invention, and especially where such displays or imaging systems are to be recycled or reimaged in short time sequences, that it is highly desireable to control, and especially to minimize, the turn-off time of such systems. The turn-off response time or relaxation time in the present invention is intended to mean the time which is typically required for a substantially complete relaxation of the electro-optic composition from its induced optically positive nematic state back into its natural optically negative cholesteric state.

Surprisingly, in the system of the present invention it has been found that the inclusion of various advantageous additives, as those illustrated at 14a in FIG. 1A, even in small amounts, drastically reduces the relaxation, retransformation, or turn-off response time in electro-optic cells and imaging systems such as those described herein. For example, it has been found that the inclusion of the advantageous additives in some embodiments reduces the relaxation or turn-off response time by orders of magnitude up to about 10.

The additives suitable for use in the advantageous system of the present invention are believed to typically fall into two general groups: (1) electrophoretic-like (specifically including both electrophoretic and dielectrophoretic additives) centers which are capable of moving within the electro-optic liquid crystalline composition when electrical fields are placed across the thickness of the compositions; and (2) dipolar particles which re-align themselves and may move within the electro-optic liquid crystalline composition in response to the application of the electrical fields used in the advantageous system of the present invention. In various embodiments hereof, the advantageous additives may be substantially insoluble and/or immiscible, or substantially soluble and/or miscible, or combinations thereof. The terms insoluble and immiscible herein refer to the substantial insolubility or substantial immiscibility (inability to mix in a single homogeneous phase) of the additives with the electro-optic liquid crystalline composition. Materials suitable for use as the electrophoretic-type additives are typically particles or dispersed globules of substantially electrically insulating materials which become triboelectrically charged in the liquid crystalline composition-additive mixture. Insoluble or immiscible additives of this type include dispersed particulate carbon; polyvinyl chloride; polystyrene; Teflon, tetrafluoroethylene resins available from DuPont; silicon carbide; titanium dioxide; silica; sulfur, ammonium chloride; lead chromate; and various other insoluble salts and pigments; polymeric additives such as a copolymer of styrene and n-butyl methacrylate, and even copolymer of styrene and n-butyl methacrylate pigmented with carbon black, and various mixtures and combinations thereof. Such materials are typically used in concentrations which are sufficiently low to allow good suspension or emulsification, without significant conglomeration of the additive material. Such materials are preferably used in concentrations of not greater than about 15 percent. Particles or globules of such materials are typically of average particle size not greater than about 5 microns, and particles of average size not greater than bout 1 micron give preferred results in the inventive system.

Where the additives are soluble or miscible, the additive is generally an organically soluble inorganic salt or organically soluble organic compound. Such soluble or miscible additives include alkyl ammonium halides such as tetraheptyl-ammonium iodide and hexadecyl-trimethylammonium bromide; alkyl phosphonium compounds including alkyl phosphonium sulfates, alkyl phosphonium bisulfides, alkyl phosphonium selenides, and alkyl phosphonium phosphates; alkyl sulphonium compounds also including alkyl sulphonium sulfates, alkyl sulphonium bisulfides, alkyl sulphonium selenides and alkyl sulphonium phosphates; anils such as p-methoxy-benzylidene-p'-n-butylaniline as well as mixtures thereof and others.

Materials typically suitable for use as dipolar-type additives include various dispersed oils such as cottonseed oil, castor oil, silicone oils, linseed oil, mineral oil, polysulphone and others. Other such materials include acetonitrile, diethylamine, iodine, ethyl dichloride, amyl acetate, butyl acetate and other alkyl acetates; diethyl ether, monochlorobenzene, toluene, metaxylene, anisole, n-propyl chloride, chloroform, steric acid, xylol, carnauba wax, nitrobenzene, polyvinyl chloride, ammonium chloride, mixtures thereof and others. In some embodiments, the above materials may also behave as electrophoretic-like materials, as described above.

The advantageous additives of the present invention are typically added in amounts not greater than about 15 percent, and even smaller amounts typically achieve the advantageous results of the present invention. Where the additive is in distinct particulate form, particles of average size not greater than about 5 microns are preferred to reduce off-times of the cells described herein, and particles of average size not greater than about 1 micron give particularly preferred or optimum off-times. Although in most embodiments hereof the shape of the additive particles is not a problem, where dipolar materials are used, elongate molecules or particles are preferred because their rotation apparently disrupts the nematic alignment to a greater extent than more spherical particles.

During operation of the electro-optic cells of the present invention having an active element comprising a liquid crystalline composition and the aforementioned advantageous additives, the additive particles are observed moving through the layer of liquid crystalline composition either toward one of the electrodes, or oscillating back and forth between the electrodes, where the electrophoretic-type additives are used, or realigning within the liquid crystalline composition matrix, where the dipolar type additives are used. Although it is not clear why the addition of such additives, and particularly, small amounts of such additives, should, in theory, significantly reduce the turn-off response time of such electro-optic cells and imaging systems, certain hypotheses have been made about the operation of this electro-optic liquid crystalline system. For example, it is believed that when the appropriate threshold field is applied across the layer of electro-optic liquid crystalline composition that the presence of the additives slightly disrupts the alignment of the field-induced nematic liquid crystalline state to which the transformed portions of the composition are driven, and that the potential energy inherent in the field-induced system, said system including the advantageous additives of the present invention, is greater than the potential energy state of the theoretically more perfectly aligned field-induced nematic state in a system which does not contain the advantageous additives. However, even this theoretical model of the operation and effect of the presence of the advantageous additive particles in the advantageous system of the present does not predict the surprising and unexpected decrease in the turn-off response time by several orders of magnitude, as is found in the practice of some embodiments of the inventive system.

Although methods for providing electrical fields across a layer of the electro-optic compositions preferred for use in the advantageous system of the present invention have been described herein with reference to parallel plate electrode cell systems, it is clear that any suitable means for providing electrical fields of field strength about or greater than the transition threshold strengths in the advantageous system of the present invention are suitable for use in various embodiments of the invention system. For example, any of the address means suggested in copending application Ser. No. 821,565 now U.S. Pat. No. 3,652,148 may be used, including electron beam address systems, and electron beam address systems using other included electrical field generating systems such as pin tubes, or layers of secondary emission materials; X–Y grid address systems; electrostatic latent images, for example, electrostatic latent images on any sort of insulating support which are brought into close proximity with layers of the electro-optic compositions of the present invention, such as an electrostatic latent image on a photoconductor layer; combined electrical and thermal address systems; and a variety of multiple cell, and coplanar multiple cell address systems, as well as any other suitable means for providing the appropriate electrical fields across the electro-optic composition layer. It is again noted that in various embodiments the electrical fields may be provided by A.C., or D.C. potential sources or any suitable combinations thereof.

The following examples further specifically define the present invention with respect to liquid crystalline electro-optic cells and imaging systems and compositions including electrophoretic-like, or dipolar additives in such compositions which are particularly suitable to control and minimize the turn-off response time in such systems. The parts and percentages are by weight unless otherwise indicated. The examples below are intended to illustrate various preferred embodiments of the novel liquid crystalline electro-optic system.

EXAMPLE I

A cholesteric liquid crystalline composition comprising about 35 percent cholesteryl chloride and about 65 percent cholesteryl nonanoate is prepared, and an about 50–50 percent mixture of $PbCrO_3$ and a copolymer of styrene and n-butyl methacrylate pigmented with carbon black, is added in an amount comprising about 5 percent of the total resultant composition. This composition is mixed to suspend the additive in the liquid crystalline composition, and a layer of the composition is placed into a cell comprising a pair of substantially transparent electrodes, the electrode surface being a transparent chromium coating on a glass substrate, and the electrodes enclose the composition in an about 1 mil thick Mylar spacer gasket (Mylar is a polyethylene terephthalate resin available from DuPont).

A voltage of about 900 V. D.C. is provided across the thickness of the composition layer, thereby causing the cholesteric-nematic phase transition. Microscopic observation reveals that the included particulate additives bound back and forth between the electrode plates. Recovery or off-times are measured for the above cell and for a control cell which does not contain the additive. The present cell exhibits off-times which are about one-half the duration of off-times in the control cell.

EXAMPLE II

A cholesteric liquid crystalline composition comprising about 59 percent cholesteryl chloride, about 39.4 percent cholesteryl nonanoate, and about 1.6 percent oleyl cholesteryl carbonate, is prepared, and polysulphone is added and dispersed therein in an amount comprising about 15 percent of the total resultant composition. A layer of this composition is provided in a cell as in Example I, except that the spacer gasket is of a thickness of about one-half micron.

A voltage of about 1,500 V., D.C. is provided across the thickness of the composition layer, thereby causing the cholesteric-nematic phase transition to occur. Under a microscope, the dispersed additive is observed to move vigorously throughout the composition. Recovery or off-times are measured for the above cell and for a control cell which does not contain the additive. The present cell exhibits off-times which are about one-third the duration of off-times in the control cell.

EXAMPLE III

A cholesteric liquid crystalline composition comprising about 60 percent cholesteryl chloride and about 40 percent cholesteryl nonanoate, is prepared, and cottonseed oil is added and dispersed therein in an amount comprising about 10 percent of the total resultant composition. A layer of this composition is provided in a cell as in Example II.

A voltage of about 100 V., D.C. is provided across the thickness of the composition layer, thereby causing the cholesteric-nematic phase transition to occur. Recovery or off-times are measured for the above cell and for a control cell which does not contain the additive. The present cell exhibits off-times which are about one-fourth the duration of off-times in the control cell.

EXAMPLE IV

A cholesteric liquid crystalline composition as in Example III is prepared, and castor oil is added and dispersed therein in an amount comprising about 15 percent of the total resultant composition. A cell as in Example I, except that the spacer-gasket is of a thickness of about 2 microns.

A voltage of about 1,000 V., D.C. is applied across the thickness of the composition layer, thereby causing the cholesteric-nematic phase transition to occur. Recovery or off-times are measured for the above cell and for a control cell which does not contain the additive. The present cell exhibits off-times which are about one-twentieth the duration of off-times in the control cell.

EXAMPLE V

A composition as in Example IV is prepared including the castor oil additive in an amount comprising about 10 percent of the total resultant composition. The cell of Example IV is used.

A voltage of about 500 V., D.C. is applied across the thickness of the composition layer, thereby causing the cholesteric-nematic phase transition to occur. Recovery or off-times are measured for the above cell and for a control cell which does not contain the additive. The present cell exhibits off-times which are about one-twentieth the duration of off-times in the control cell.

EXAMPLE VI

A cholesteric liquid crystalline composition as in Example III is prepared, and tetraheptyl ammonium iodide is added in an amount comprising about 0.4 percent of the total resultant composition. A layer of this composition is provided in a cell as in Example I.

A voltage of about 880 V., A.C. 10Hz, is provided across the thickness of the composition layer, thereby causing the cholesteric-nematic phase transition to occur. This all exhibits a response or off-time of about 0.5 seconds.

A control cell which does not contain the additive is transformed with a voltage of about 792 V., A.C. 10Hz, and exhibits a response or off-time of about 3.8 seconds.

EXAMPLE VII

A cholesteric liquid crystalline composition as in Example III is prepared and p-methoxy-benzylidene-p'-n-butylaniline (hereafter MBBA) is added in an amount comprising about 1.0 percent of the total resultant composition. A layer of this composition is provided in a cell as in Example I.

A voltage of about 500 V., D.C. is provided across the thickness of the composition layer thereby causing the cholesteric-nematic phase transition to occur. This cell exhibits a response or off-time of about 2.0 seconds. A control cell which does not contain the additive, exhibits a response or off-time of about 20 seconds.

EXAMPLE VIII

A composition as in Example VIII is prepared including the MBBA additive in an amount comprising about 9.2 percent of the total resultant composition. The cell is transformed as in Example VII and exhibits a response or off-time of about 20 milliseconds. A control cell which does not contain the additive exhibits a response or off-time of about 20 seconds.

The above examples illustrate various cholesteric liquid crystalline compositions and additives which exhibit the inventive effect of the present invention. However, these examples are in no way limiting. Various other liquid crystalline compositions, such as all those described in application Ser. No. 821,565, now U.S. Pat. No. 3,652,148 are suitable for use herein, and various other additives as disclosed herein provide the advantageous results of the present invention.

Although specific components and proportions have been stated in the above description of preferred embodiments of the advantageous liquid crystalline electro-optic system and novel compositions for use therein, other suitable materials and variations in the various steps in the system as listed herein may be used with satisfactory results and various degrees of quality. In addition, other materials and steps may be added to those used herein and variations may be made in the process to synergize, enhance or otherwise modify the properties of or the uses for the present invention. For example, various other mixtures of liquid crystals which will undergo the phase-transition imaging process may be discovered and used in the system of the present invention and such mixtures may require somewhat different thicknesses, threshold fields, temperature ranges, and other conditions for preferred results in accordance with the present invention. Likewise, various other means of creating electrical fields of the requisite threshold field strength and other means of addressing the inventive electro-optic systems may be used with satisfactory results in the present invention.

It will be understood that various changes in the details, materials, steps, and arrangements of elements which have been herein described and illustrated in order to explain the nature of the invention, will occur to and may be made by those skilled in the art upon a reading of this disclosure, and such changes are intended to be within the principle and scope of this invention.

What is claimed is:

1. A method of transforming an optically negative liquid crystalline material to an optically positive state comprising providing an optically negative liquid crystalline composition at a temperature in the optically negative-optically positive transition range of said liquid crystalline composition, said composition additionally comprising an additive of electrophoretic-like or dipolar material dispersed throughout said liquid crystalline material, and applying an electrical field across said liquid crystalline material within the optically negative-optically positive transition electrical field range of said liquid crystalline composition.

2. The method of claim 1 wherein the optically negative liquid crystalline composition exhibits cholesteric liquid crystalline characteristics.

3. The method of producing a cholesteric to nematic phase transition in a liquid crystalline material comprising providing a cholesteric liquid crystalline composition at a temperature in the cholesteric mesophase temperature range of said liquid crystalline composition, said liquid crystalline composition additionally comprising an additive of electrophoretic-like or dipolar material dispersed throughout said liquid crystalline composition, and applying an electrical field across said liquid crystalline composition within the cholesteric-nematic phase transition electrical field range of said liquid-crystalline composition.

4. The method of producing a transient electro-optic effect comprising performing the method of claim 2 and reducing the electrical field across the liquid crystalline composition to a field strength below the phase transition threshold field strength of the liquid crystalline composition.

5. The method of claim 4 wherein the additive is soluble or miscible in the cholesteric liquid crystalline composition.

6. The method of claim 4 wherein the additive is insoluble and immiscible in the cholesteric liquid crystalline composition.

7. The method of claim 4 wherein said additive comprises not greater than about 15 percent of the entire composition.

8. The method of claim 4 wherein the additive comprises particles of average particle size not greater than about 5 microns.

9. The method of claim 8 wherein the additive comprises particles of average particle size not greater than about 1 micron.

10. The method of claim 4 wherein the liquid crystalline composition is arranged in a layer of said composition.

11. The method of claim 10 wherein said layer is of a thickness not greater than about 250 microns.

12. The method of claim 11 wherein said layer is of a thickness in the range between about 1 micron and about 50 microns.

13. The method of claim 4 wherein the electrical field placed across the composition is in an imagewise configuration.

14. The method of claim 10 wherein the layer of composition is provided between a pair of electrodes, one of which is substantially transparent.

15. The method of claim 14 wherein both electrodes are substantially transparent.

16. The method of claim 14 wherein said layer of cholesteric liquid crystalline composition is shaped in a desired image configuration.

17. The method of claim 14 wherein at least one of the electrodes is shaped in a desired image configuration.

18. The method of claim 10 wherein the electrical field applied across the liquid crystalline composition is of a field strength not less than about $10^2$ volts/cm. of thickness of the liquid crystalline composition.

19. The method of claim 10 wherein the composition layer is viewed with means for enhancing contrast between transformed and nontransformed areas thereof.

20. The method of claim 10 wherein the composition layer is between polarizers and viewed with transmitted light.

* * * * *